Oct. 29, 1946.  R. R. JUST  2,410,217
SUPPORT FOR SHEEP SHEARING APPARATUS
Filed March 31, 1944  4 Sheets-Sheet 1

Inventor
Ralph R. Just

By Clarence A. O'Brien
and Harvey B. Jacobson
Attorneys

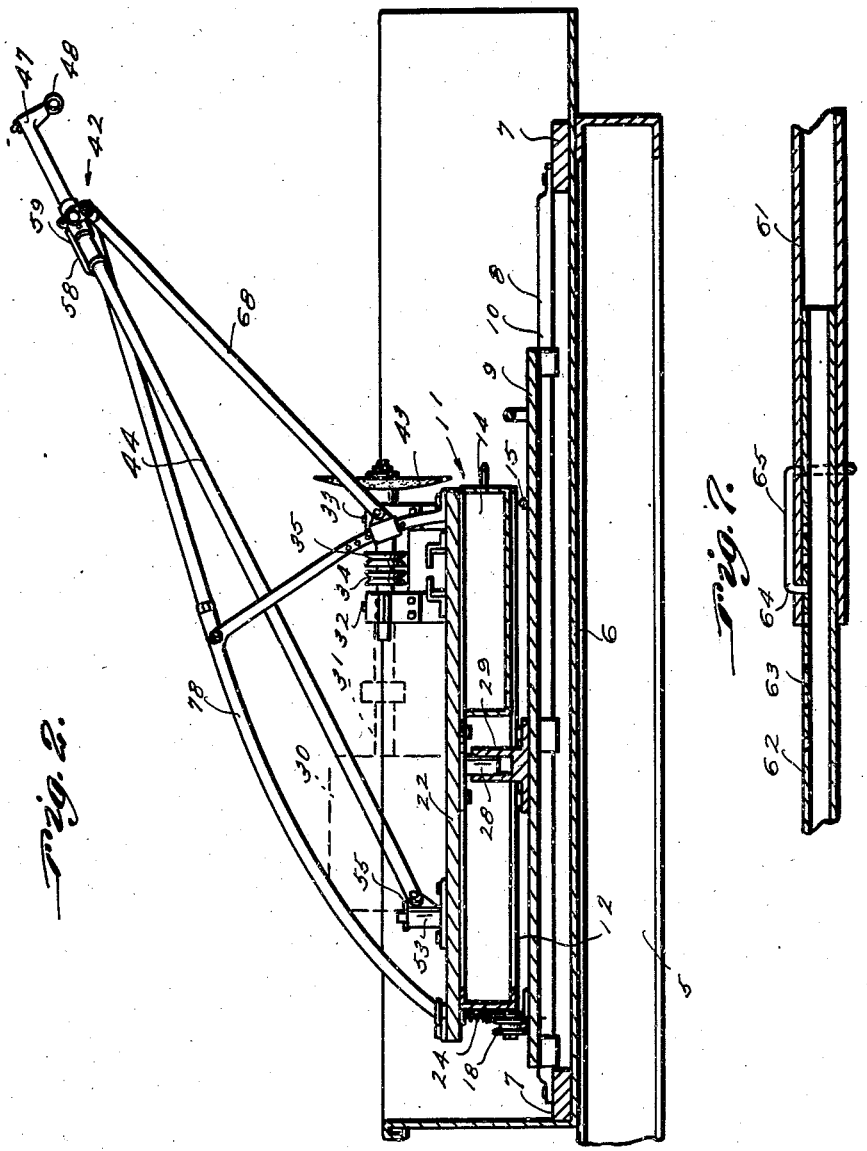

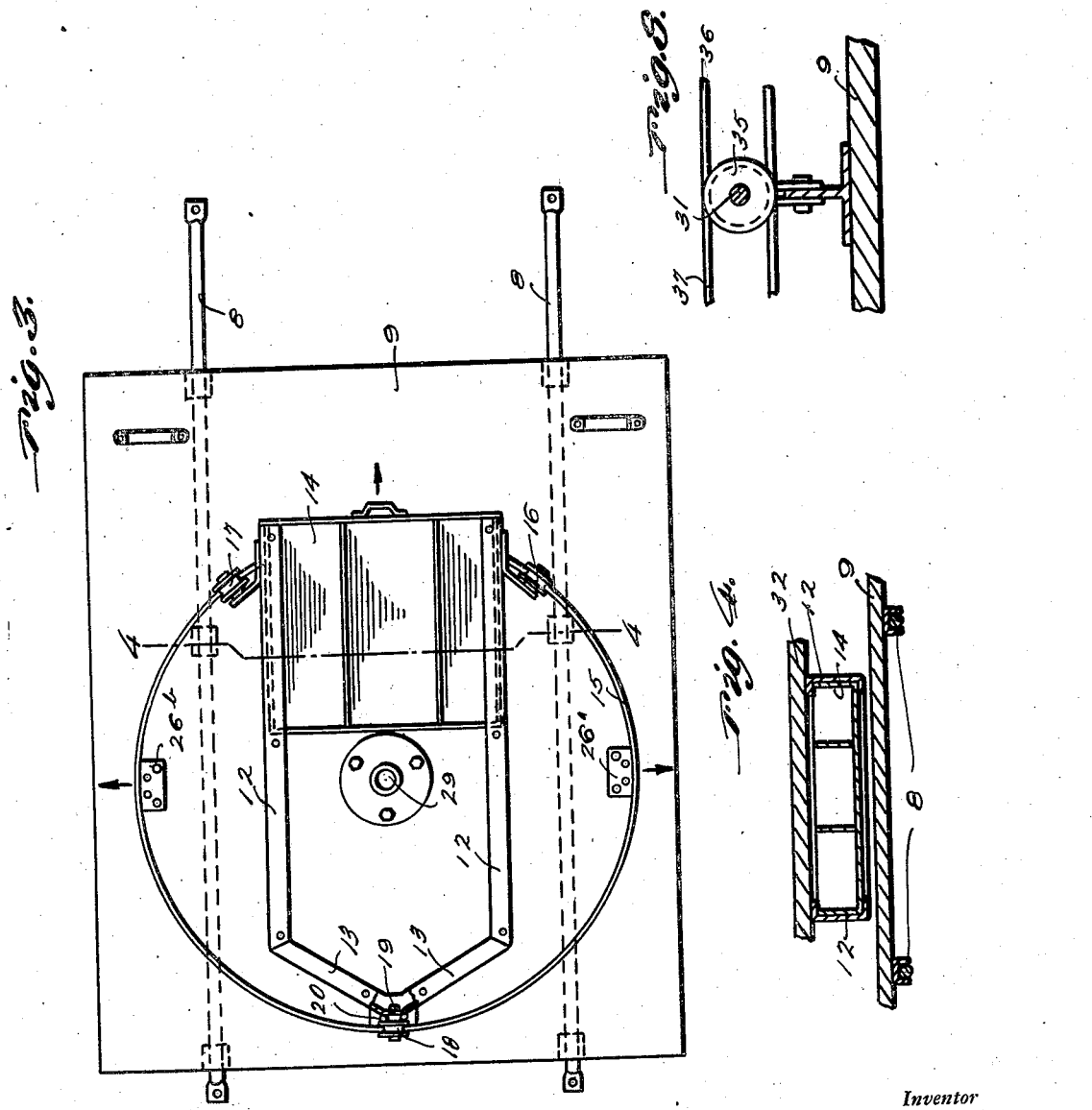

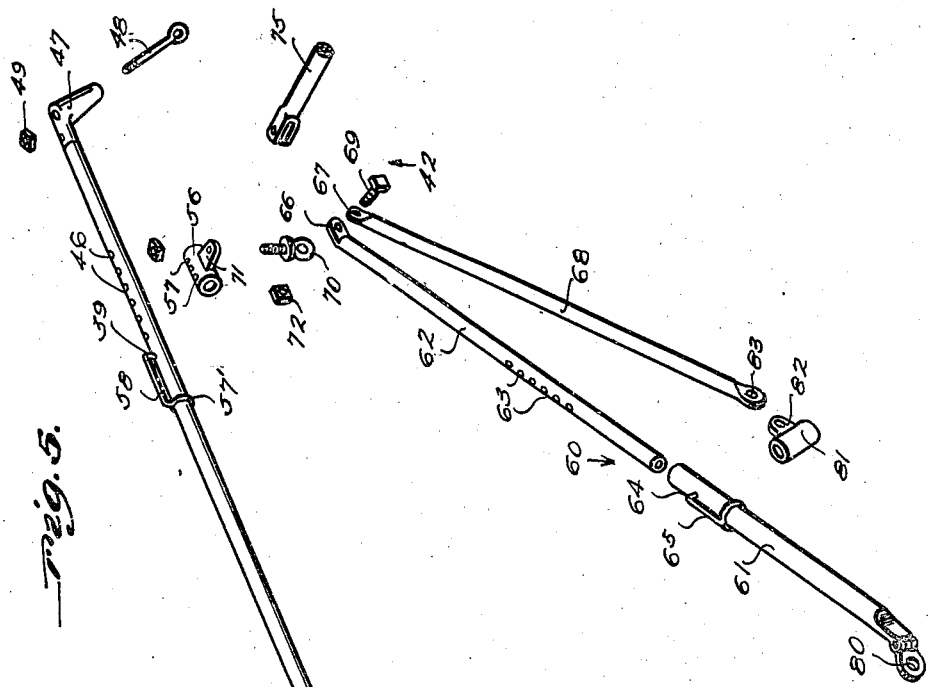

Patented Oct. 29, 1946

2,410,217

UNITED STATES PATENT OFFICE 2,410,217

SUPPORT FOR SHEEPSHEARING APPARATUS

Ralph R. Just, Salem, Oreg.

Application March 31, 1944, Serial No. 529,021

3 Claims. (Cl. 248—2)

This invention relates to new and useful improvements in sheep shearing apparatus, the principal object being to provide a portable outfit adapted to be handily operated from a pick-up truck or trailer.

Another important object of the invention is to provide a portable sheep shearing machine incorporating a turntable, to the end, that the apparatus can be turned to either side of the carrier vehicle in order to meet various working conditions.

Still another important object of the invention is to provide a portable sheep shearing apparatus which includes adjustable telescopic supporting means for the usual flexible shearing shafts, to the end that they will always be held in proper position yet out of the way of the workmen.

A further important object of the invention is to provide an apparatus of the character described in which a shear sharpening element operates in conjunction with the mechanism of the apparatus.

Other objects and advantages of the invention will become apparent to the reader of the following description.

In the drawings—

Figure 2 is a vertical longitudinal sectional view through the apparatus.

Figure 3 is a top plan view of the apparatus with the table and mechanism supported thereby removed, but showing the chassis structure of the table.

Figure 4 is a fragmentary sectional view taken on the line 4—4 of Figure 3.

Figure 5 is a perspective exploded vew showing the various details employed in conjunction with one of the shearing table supporting assemblies.

Figure 6 is a fragmentary detailed sectional view showing the detent for the table.

Figure 7 is a fragmentary longitudinal sectional view through the adjusting means and one of the telescoping hanger bars.

Figure 8 is a fragmentary detailed sectional view taken substantially on the line 8—8 of Figure 1.

Figure 1:
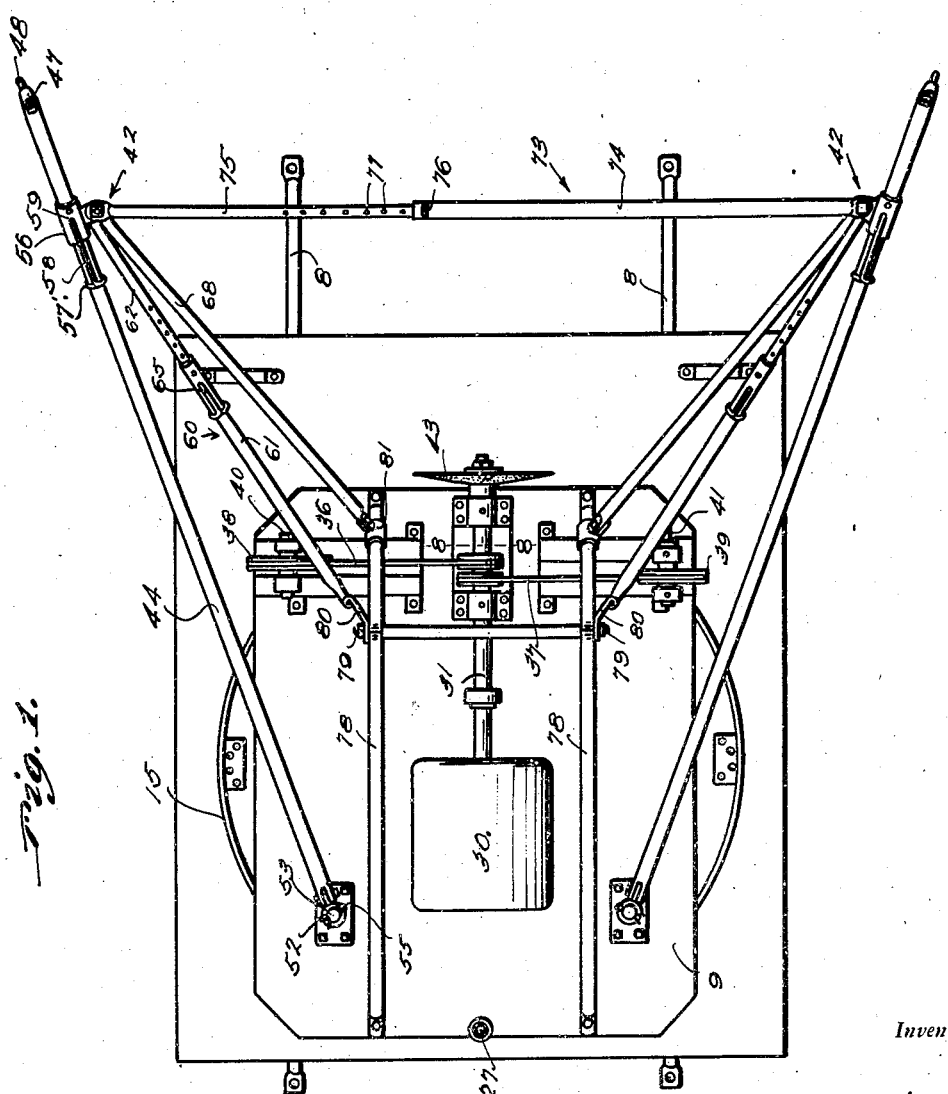
Figure 1 represents a top plan view.

Referring to the drawings wherein like numerals designate like parts, it can be seen that nueral 5 denotes the bed of a truck or trailer upon which is a wagon body 6 upon which parallel supporting bars 7, 7 are located and bridged by parallel supporting rails 8, 8.

Numeral 9 denotes a platform having depending saddles 10 slidably embracing the rails 8 to permit longitudinal sliding action of the platform 9 on the rails.

The apparatus further encompasses the turntable assembly 11 which consists of a frame shown in Figure 3 made up of a pair of channeled bars 12, 12 connected at a pair of its adjacent ends by converging channeled members 13. A utility drawer 14 is slidable into the opposite end portion of the frame.

Upon the platform 9 is a circular track 15 upon which grooved wheels 16, 17 and 18 carried by the frame 12, 13 ride.

The wheel 18 is mounted on a short shank 19 projecting from the frame 12, 13 and this is straddled by a fork 20 at the lower end of a stem 21 which is vertically slidable through a table top 22 forming part of the turntable assembly 11. The stem 21 is slidably disposed through an apertured ear 23 on the merging portion of the members 13, 13 and a coiled compression spring 24 is interposed between the ear 23 and a second ear 25 on the upper portion of the same parts 13. The yoke 20 is engageable into recesses in a keeper plate 26 which is secured to the platform 9 (see Figure 6). The upper end of the stem 21 is provided with a knob 27 whereby the detent can be easily operated. It can be seen that additional keeper plates 26a and 26b are provided so that the turntable assembly can be swung from the position shown in Figure 2 to either a right or left lateral disposition.

The turntable assembly 11 has a stub shaft 28 depending from the table top 22 and this is disposed into a socket bearing 29 rising from the platform 9.

The turntable top 22 suports a power plant 30 having a drive shaft 31 disposed through spaced bearings 32, 33. This drive shaft 31 carries a pair of pulleys 34, 35 over which belts 36, 37 are trained. These passing over further pulleys 38, 39, respectively, located on shafts 40, 41, respectively. The usual shearing shafts (flexible) are attached to the shafts 40, 41 and are supported by hanger assemblies generally referred to by numerals 42.

At this point, it can be seen that the outer end of the shaft 31 is provided with a sharpening stone 43, so that the shears (not shown) can be conveniently sharpened at the site of use.

Each of the hanger assemblies 42 consists of an elongated bar 44 formed with a plurality of openings 46 adjacent its outer end and at its outer end a depending shank 47 is provided with a longitudinal bore for receiving an eye-bolt 48, this being equipped with a nut 49. Through the eye of the eye-bolt is disposed the usual flexible shearing cable (not shown).

The other end of the bar 44 is bifurcated as at 50 to pivotally engage an ear 51 located on a collar 52 which is adapted to be disposed onto a riser 53 rising from a plate 54 attached to the platform 9. A cotter key 55 prevents rising of the collar 52.

On the bar 44 is a slidable collar 56 at the openings 46 and this collar is formed with openings 57 which are registrable with the openings 46 and the bar 44. A spring wire ring 57' on the bar 44 has an arm 58 provided with a depending finger 59 which is adapted to be inserted through registering openings 57, 46 to secure the collar 56 in a definite position on the bar 44.

To permit adjusting of the bar 44 to different cable hanging positions, it can be seen, that a sustaining bar generally referred to by numeral 60 (see Figure 5) is provided, this consisting of a pair of telescopic tubes 61, 62, the tube 62 having openings 63 therein to receive the finger 64 of an arm 65, which projects through an opening in the tube 61 and into any one of the openings 63.

The upper end of the section 62 is provided with an apertured lug 66 which is adapted to match the apertured lug 67 of a brace bar 68 and through these lugs 66, 67 is disposed a bolt 69, this bolt also passing through an eye-bolt 70, the eye-bolt 70, in turn, passing through an apertured lug 71 on the collar 56. The eye-bolt 70 is provided with a nut 72. It can also be seen that a telescopic bridge member 73 made up of telescopic sections 74, 75 has its outer end bifurcated and perforated to span the lugs 71 of the collars 56 and have the eye-bolt 70 pass therethrough. The section 74 has an opening through which a pin or the like 76 is disposed and this pin can be disposed through any one of the openings 77 located in the section 75.

A stationary frame consisting of raised parallel bars 78, 78 are disposed over the platform 9. A tie-bolt passes through these frame members 78, 78 and has nuts 79 at its ends which serve to secure hinge plates 80 in place. These hinge plates being located at the inner ends of the telescopic sections 61. (See Figures 1 and 5.)

The stationary frame members 78, 78 each has a collar 81 (see Figures 1 and 5) and each collar 81 has an ear 82 for attachment to the corresponding ear 83 on the aforementioned bar 68.

Thus it can be seen, that the hanger assemblies 42 by means of the detents 58, 65, the hinges and pivotal connections, are capable of being adjusted to suspend shearing cables, which are flexible, in any manner convenient to the workmen.

Further it can be seen, that the assembly can be rotated so as to project from one side or the other of the vehicle or swung to the non-use position shown in Figure 2. To project from the rear of the vehicle, the apparatus need only be shifted rearwardly on the rails 8, 8 to project over the rear of the vehicle.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In apparatus of the class described, a horizontal support, and shearer cable hanger means comprising a pair of elongated hanger bars inclining upwardly from said support adjacent opposite sides thereof and having lower ends pivoted on said support whereby said bars are adjustable laterally and vertically into different set positions, and means to adjust said hanger bars comprising a pair of horizontal raised bars fixed on said support intermediate said pair of hanger bars, a pair of extensible sustaining bars hingedly connected to said hanger bars adjacent the upper ends thereof and also hinged to said parallel bars, a pair of brace bars pivoted to the hinged connection of the sustaining bars and also slidably connected to said parallel bars, and bridging means extending between said hinged connections.

2. In apparatus of the class described, a horizontal support, and shearer cable hanger means comprising a pair of elongated hanger bars inclining upwardly from said support adjacent opposite sides thereof and having lower ends pivoted on said support whereby said bars are adjustable laterally and vertically into different set positions, and means to adjust said hanger bars comprising a pair of horizontal raised bars fixed on said support intermediate said pair of hanger bars, a pair of extensible sustaining bars hingedly connected to said hanger bars adjacent the upper ends thereof and also hinged to said parallel bars, a pair of brace bars pivoted to the hinged connection of the sustaining bars and also slidably connected to said parallel bars, and bridging means extending between said hinged connections and comprising telescopic sections.

3. In apparatus of the class described, a horizontal support, and shearer cable hanger means comprising a pair of elongated hanger bars inclining upwardly from said support adjacent opposite sides thereof and having lower ends pivoted on said support whereby said bars are adjustable laterally and vertically into different set positions, and means to adjust said hanger bars comprising a pair of horizontal raised bars fixed on said support intermediate said pair of hanger bars, a pair of extensible sustaining bars hingedly connected to said hanger bars adjacent the upper ends thereof and also hinged to said parallel bars, a pair of brace bars pivoted to the hinged connections of the sustaining bars and also slidably connected to said parallel bars, and bridging means extending between said hinged connections and comprising telescopic sections, said hinged connections being slidable on said hanger bars into different set positions.

RALPH R. JUST.